(12) United States Patent
Ensberg et al.

(10) Patent No.: US 11,055,319 B2
(45) Date of Patent: Jul. 6, 2021

(54) DATA-DRIVEN FEATURES VIA SIGNAL CLUSTERING

(71) Applicant: Hamilton Sundstrand Corporation, Charlotte, NC (US)

(72) Inventors: Joseph J. Ensberg, West Hartford, CT (US); Chetan Prabhu, New York, NY (US); Marlee Ann Stevenson, Ridgewood, NY (US); Kamron Saniee, Brooklyn, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 235 days.

(21) Appl. No.: 15/940,100

(22) Filed: Mar. 29, 2018

(65) Prior Publication Data
US 2019/0303492 A1 Oct. 3, 2019

(51) Int. Cl.
| G06F 16/00 | (2019.01) |
| G06F 16/28 | (2019.01) |
| G06F 16/22 | (2019.01) |
| G06K 9/62  | (2006.01) |
| B64D 45/00 | (2006.01) |

(52) U.S. Cl.
CPC ........ *G06F 16/285* (2019.01); *G06F 16/2228* (2019.01); *G06K 9/6218* (2013.01); *B64D 2045/0085* (2013.01)

(58) Field of Classification Search
CPC ..... G06F 16/00; G06F 16/285; G06F 16/2228
See application file for complete search history.

(56) References Cited

U.S. PATENT DOCUMENTS

| 7,197,503 B2 | 3/2007 | Palanisamy et al. |
| 7,552,005 B2 | 6/2009 | Kim et al. |
| 7,693,643 B2 | 4/2010 | Kim et al. |
| 9,919,712 B1* | 3/2018 | Doyen ................. A61B 5/0022 |
| 2007/0088550 A1* | 4/2007 | Filev ................... G05B 23/0221 704/245 |
| 2017/0249200 A1* | 8/2017 | Mustafi ............... G06F 11/0709 |
| 2019/0034517 A1* | 1/2019 | Byrd ....................... G06F 17/40 |
| 2019/0102957 A1* | 4/2019 | Huber .................. G07C 5/0808 |

FOREIGN PATENT DOCUMENTS

WO    WO2014/093670 A1    6/2014

OTHER PUBLICATIONS

Extended European Search Report for EP Application No. 19166196.6, dated Jul. 11, 2019, 8 pages.
L. Li, "Anomaly Detection in Airline Routine Operations Using Flight Data Recorder Data", from S.M. Massachusetts Institute of Technology—Submitted in partial fulfillment of the requirements for the degree of Doctor of Philosophy, Jun. 2013, 145 pages.
Communication Pursuant to Article 94(3) EPC for EP Application No. 19166196.6, dated Mar. 11, 2021, 4 pages.

\* cited by examiner

*Primary Examiner* — Khanh B Pham
(74) *Attorney, Agent, or Firm* — Kinney & Lange, P.A.

(57) ABSTRACT

A method is described of identifying time-series signals that contain information useful for predicting impending event messages relating to one or more of safety, maintenance, and system operation information before they occur. The method includes loading a plurality of time-series signals with assigned signal name and associated time-series data into a machine-readable storage medium and grouping the plurality of time-series signals based on textual similarity of the corresponding signal names into a signal cluster.

19 Claims, 4 Drawing Sheets

DATA-DRIVEN FEATURES VIA SIGNAL CLUSTERING

BACKGROUND

The present disclosure is generally related to aircraft analytics and, more specifically, to identifying data with predictive capability.

Modern aircraft are far more complex and produce significantly more data than their earlier counterparts. Full-flight data files sent from airlines contain useful information relative to predicting impending events (e.g., system alerts, maintenance messages, engine-indication and crew-alerting (EICAS) messages, etc.) before they occur, but often contain thousands of time-series signals, most of which have cryptic names (e.g., "OFVLPOS_CARDCTLLF 1 Hz_1833"). The current approach for identifying analytics involves subject-matter experts, leveraging years of experience and detailed knowledge of the physics governing aircraft systems. Given the complexity of modern aircraft systems, the requisite engineering experience can take years to accumulate and due to the general separation of systems, solutions posed by subject-matter experts tend to be biased by their particular area of expertise. As such, subject-matter experts often do not see potential opportunities for using information in non-conventional ways outside of their domain. Further, subject-matter experts generally do not have the computer/data science skills needed to process large volumes of newly available data efficiently.

A systematic and robust methodology is needed for identifying which full-flight time-series signals can be used to predict maintenance and thereby avoid unplanned aircraft service interruptions, while minimizing the need for years' worth of subject-matter expertise.

SUMMARY

A method is described of identifying time-series signals that contain information useful for predicting impending event messages relating to one or more of safety, maintenance, and system operation information, before they occur. The method includes loading a plurality of time-series signals with assigned signal name and associated time-series data into a machine-readable storage medium and grouping the plurality of time-series signals based on textual similarity of the corresponding signal names into a signal cluster.

A method of minimizing service interruption of an aircraft includes loading a plurality of time-series signals with an assigned signal name and associated time-series data into a machine-readable storage medium, grouping the plurality of time-series signals based on textual similarity of the corresponding signal names into a signal cluster, extracting a plurality of feature values from the signal cluster, correlating the cluster feature values with event message time-stamps to identify cluster feature values that change in a manner that indicates within an actionable alerting time period that the event message will occur, and using the feature values to predict the event message before it occurs and provide an actionable recommendation. The event messages relate to at least one of safety, maintenance, and engine operation.

The present summary is provided only by way of example, and not limitation. Other aspects of the present disclosure will be appreciated in view of the entirety of the present disclosure, including the entire text, claims and accompanying figures.

Figure 1:
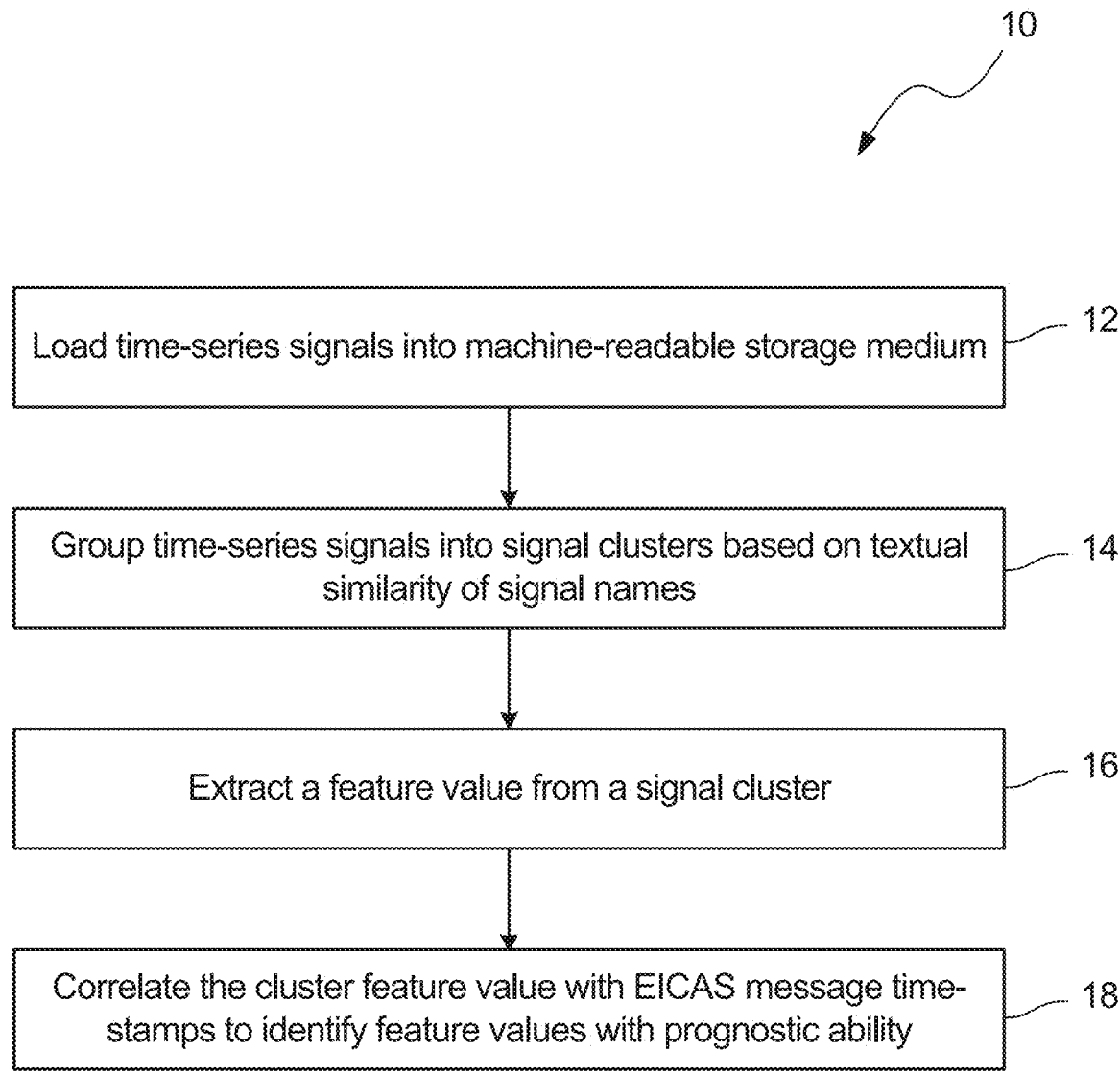
FIG. 1 is a flow chart of a method of the present disclosure.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Thousands of time-series signals (e.g., signals that carry data collected by on-board sensors, etc.) are produced during each aircraft flight and may carry information that can be used to avoid unplanned aircraft service interruptions. The present disclosure provides a systematic, robust methodology for identifying which full-flight time-series signals carry relevant information that is prognostic. The current invention leverages information contained within signal names to identify logical groupings in an automated fashion and assesses grouping features against all events where time-stamps indicate system failures, maintenance needs, operation status, safety hazards, and other information tending to require attention in the immediate, near-term, or foreseeable future, to identify useful combinations of signals that could be used to predict the particular events before they occur. In some aircraft, event time-stamps are referred to as engine-indication and crew-alerting system (EICAS) messages. The terms "EICAS messages" and "event messages" and "EICAS message time-stamp" and "event time-stamp" are used interchangeably herein. The ability to predict event messages before they occur will allow for actionable recommendations to be provided to airlines and/or component supply chains to prevent unscheduled service interruptions and to minimize service interruptions when they occur. For instance, if an event message can be predicted, necessary replacement parts can be pre-positioned so that they are available when the service interruption does occur, or the maintenance can be performed at a more opportune time and/or location.

FIG. 1 is a flow chart of method 10 for identifying time-series signals that contain information useful for predicting impending event messages. Individual steps of method 10 are described in further detail in FIGS. 2A, 2B, 3A, 3B, and 4. In brief, method 10 includes loading full in-flight time-series signals into a machine-readable storage system (step 12), automatically identifying logical groupings of time-series signals based on textual similarity of signal names and grouping the signals into clusters (step 14), extracting a feature value from the signal cluster (step 16), and correlating cluster feature values extracted over time to event message time-stamps to identify those with prognostic ability (step 18). Steps 14, 16, and 18 are conducted by a processor with a machine-readable memory and encoded with instructions for executing the steps. The machine-readable memory can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

Figures 2A, 2B:
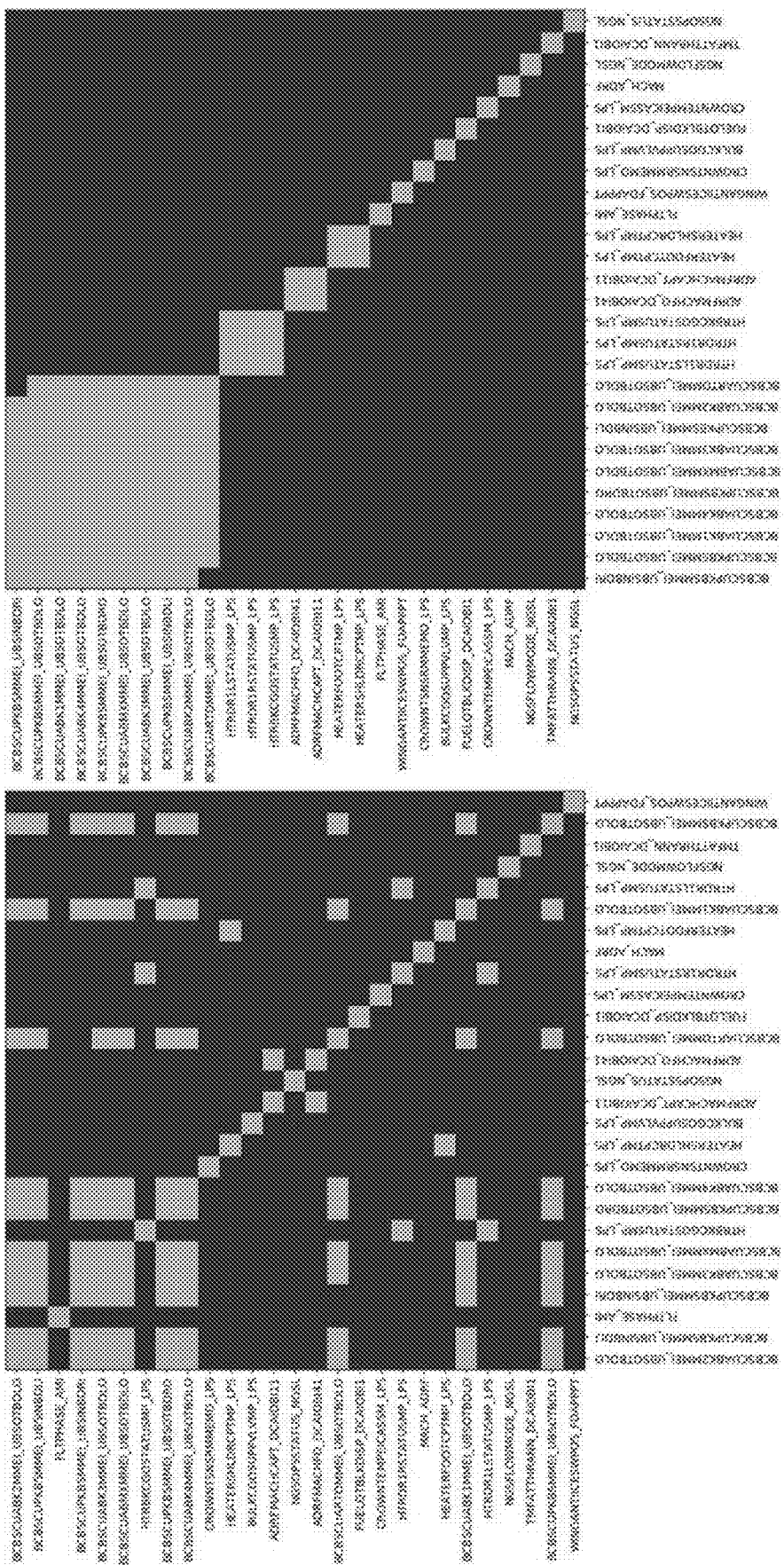
FIG. 2A is graphical representation of textual signal clustering.
FIG. 2B is a graphical representation of textual signal clustering in which the signals of FIG. 2A have been sorted according to signal name.

FIG. 2A is graphical representation of textual signal clustering (step 14), in which a list of time-series signal names is plotted on both the x- and y-axes with the list of time-series signal names arranged in the same order on each axis. A processor is used to compare each signal name on the x-axis with each signal name on the y-axis character-by-character and to assign a similarity score to indicate the textual similarity between each pair of signal names (i.e., each signal name on the x-axis paired with each signal name on the y-axis). The similarity score ranges from a defined value indicating no similarity between the signal names to a defined value indicating an exact match of the signal names. For example, a similarity score of zero may indicate that there are no characters that are the same or no character groupings that are the same (e.g., "EMU_N1_VIB_ACCEL_B_R" as compared to "WING ANTI-ICE SW POS"), whereas a similarity score of one may indicate an exact match in signal names (e.g., "WING ANTI-ICE SW POS" as compared to "WING ANTI-ICE SW POS"). A threshold similarity score is defined between the no match and exact match values, indicating a high enough degree of similarity that the likelihood that the signals contain related data is more favorable than not. For example, signal names containing the same name of a component and feature (e.g., "FAN" and "ACCEL") are more likely to have related data than signal names containing different components and/or different features (e.g., "THRUST_REV" and "ANTI-ICE"). An algorithm used for assigning the similarity score can be developed based on the names of signals used in a particular aircraft or a standard naming convention. Every combination of signal names is assigned a similarity score. A light gray box in FIG. 2A indicates pairs of signal names that have a similarity score exceeding the defined threshold value. The diagonal line across FIG. 2A indicates exact matches in signal names. All other light gray boxes indicate pairs of non-identical signal names that have a similarity score exceeding the defined threshold value.

FIG. 2B is a graphical representation of textual signal clustering in which the signal pairs of FIG. 2A, having non-identical signal names that have a similarity score exceeding the defined threshold, have been sorted according to signal name into clusters. The signal names on the x- and y-axes in FIG. 2B are the same, but are not arranged in the same order relative to the pre-sorted order in FIG. 2A. In this non-limiting embodiment, the signal pairs are sorted using the reverse Cuthill-Mckee ordering algorithm, so that the light gray boxes far from the diagonal move toward the diagonal such that filled-in blocks tend to form. The larger light gray filled-in blocks are referred to herein as clusters. Each cluster contains at least two unique signal names (i.e., not exact matches) and up to an undefined number of signal names. As such, clusters can vary significantly in size. Because the signals are sorted into clusters according to textual similarity of signal names, the size of each cluster is generally defined by the number of signals related to particular component and/or feature (e.g., "THRUST_REV"). For example, there are multiple accelerometers to measure engine vibration, which produces a relatively large cluster as illustrated in the upper left-hand corner of FIG. 2B.

While the process of textual signal clustering is represented graphically in FIGS. 2A and 2B, it will be understood by one of ordinary skill in the art that the graphs of FIGS. 2A and 2B are merely used to illustrate one embodiment of the disclosed process and that there is no requirement to plot or display the clustering of signal names in the exact manner disclosed.

Once the clusters have been defined according to step 14 (FIGS. 2A and 2B), time-series signals within a cluster are extracted and the associated time-series data compared to obtain one or more cluster feature values (step 16). Each time-series signal has an associated data file that contains data collected during an event, which, as used herein, refers to a discrete occurrence. In the following examples, the event is a single flight of an aircraft; however, it will be understood by one of ordinary skill in the art that the method disclosed can be adapted for a wide variety of applications and is not limited to flight events or even maintenance predicting applications for an aircraft. During a flight, a variety of sensors and processors are collecting and storing data relating to system operation. Generally, this data is not retrieved from the aircraft until after the flight has ended. At this time, the full-flight data files, with the thousands of time-series signals and associated time-series data can be loaded into a machine-readable medium for storage and eventual processing. The time-series data of each signal in a cluster can be compared to the time-series data of each of the other signals in that same cluster. For ease of discussion, a cluster of size two (having two unique signals) is considered in the following examples.

In a non-limiting cluster size of two, a relationship between the time-series data of one signal and the time-series data of the other signal can be calculated based on the difference between the values of the time-series data. The relationship is referred to herein as a cluster feature value and can include a mean, median, standard deviation, minimum, maximum, or percentile distribution of the difference between time-series data or other statistically-relevant data point that can be obtained for each flight/event, which can be identified as discrete occurrences separated in time. For example, the two signals may each have time-series temperature data for a flight/event. The difference in temperature between the two signals as a function of time can be determined and the mean difference can be calculated. The mean difference is a cluster feature value, which is a single data point. In addition to the mean, other cluster feature values (e.g., median, standard deviation, etc.) can be calculated for the same pair of signals/time-series data. This same process can also be applied to time-series data of larger clusters (e.g., greater than two unique signals). However, to reduce computational demands, principal component analysis may be preferred for comparing time-series data from a large number of signals. The cluster feature value can be extracted from the full data set of the time-series data or from a subset of time-series data. For example, time-series data for acceleration of a component may be divided according to flight phase. In some embodiments, feature values can be extracted from time-series data for a period of time immediately surrounding a transition from one flight phase to the next (e.g., ten seconds on either side of a flight phase transition point). In some instances a subset of the time-series data may provide a better indication of system operation.

Figure 3B:
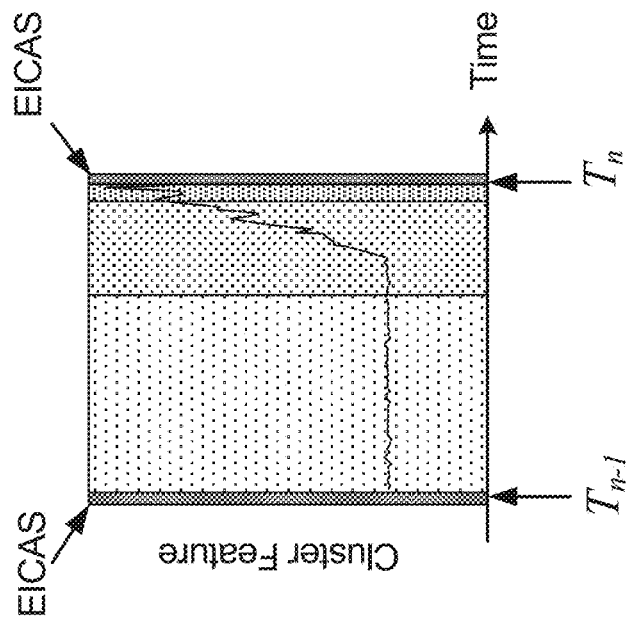
FIG. 3B is the graphical representation of FIG. 3A, including cluster feature data.
Figure 3A:
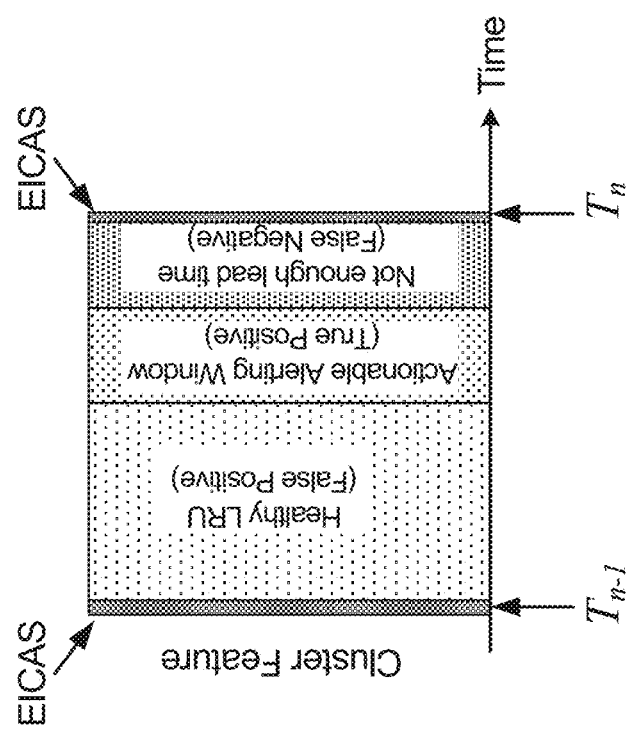
FIG. 3A is a graphical representation of windows of time between engine-indication and crew-alerting system (EICAS) messages.

The cluster feature value is calculated for the two signals in the above example for each flight to obtain multiple cluster feature values, which can be compared as a function of time to event messages. FIG. 3A is a graphical representation of windows of time between event messages (shown as EICAS messages). In the present example, an EICAS message at $T_{n-1}$ has been addressed and the system has resumed healthy operation (e.g., healthy line replaceable unit (LRU) or accessories). The next time the same EICAS message is sent occurs at $T_n$. At this point, immediate or near-term attention may be needed to address the message depending on what it is, noting that not all EICAS messages require the same response. Generally, a significant period of time occurring over multiple flights of an aircraft, separates identical EICAS messages. As illustrated in FIG. 3A, there is a period of time between EICAS messages (at $T_{n-1}$ and $T_n$) during which the system is healthy or operating effectively without the need for maintenance. Following this window, there is an actionable alerting window. The actionable alerting window indicates a period of time between the two EICAS message time-stamps in which action can be taken to schedule maintenance or minimize service interruption (e.g., pre-position replacement parts or preemptively schedule maintenance at an opportune time and/or location.). Immediately preceding the second EICAS message time-stamp, there is a non-actionable window, indicating a period of time over which there is not enough lead time to schedule maintenance or avoid an unplanned service interruption. It will be understood by one of ordinary skill in the art that the actual length of each period of time for the identified windows can vary widely depending on the type of EICAS message. For example, EICAS messages indicating system failure may require immediate attention, whereas other messages can remain on through multiple additional flights without posing a risk to safety or additional maintenance (representing a relatively large actionable alerting window).

In some instances, only a single event (EICAS) message time-stamp may be present in the time-series data (e.g., identifying the one and only event of a particular kind). When only one event message time-stamp is present, $T_{n-1}$ can be defined as $T_n$ minus a period of time (e.g., $T_n$—three months), reflecting an expectation that the system was healthy at some point in time before the onset of what may be the one and only instance of the particular event message. In this case, the actionable alerting window is the period of time prior to the event message in which action can be taken to minimize service interruption. FIG. 3B is the graphical representation of FIG. 3A with cluster feature values extracted from the two signals discussed above and plotted as a function of time. Each cluster feature value data point represents one flight. In this case, the feature value or the relationship between the two signals in the cluster shows prognostic significance. As shown in FIG. 3B, the cluster feature values remain relatively constant during the time period following the first EICAS message time-stamp when the system is healthy. The feature values begin to significantly drift away from the relatively constant value during the actionable alerting window and continue to drift further during the non-actionable window. FIG. 3B does not contain actual data, but is merely used for graphical representation of a feature value that can be used to predict EICAS messages. With respect to the example of the two signals having time-series temperature data, FIG. 3B indicates that the mean difference in the temperature between the data of the two signals remains relatively constant over a number of flights. This relatively constant mean difference corresponds to the period of time after the first EICAS message has been addressed and the system is expected to be healthy. Prior to the second EICAS message, the mean difference in the temperature begins to increase. In this case, the increase is significant in that it is observable. As used herein, any drift away from a relatively constant value or any change in value in comparison to an earlier period of time when the system is expected to be healthy can be considered significant if it drifts outside of a predicted error range in the data. The rise in the mean difference in temperature is first observed within the actionable alerting window, which indicates that this particular feature value (and combination of signals) may be used to predict the occurrence of an EICAS message before it occurs and avoid unplanned service interruption. FIG. 3B represents a single example of a successful correlation between signal/cluster feature values and EICAS messages. Not all cluster feature values will exhibit differences within the actionable alerting window. Some may show wide fluctuation through all windows or no change at all. Feature values with significant fluctuation or change in the healthy LRU window may be considered false positives as the fluctuation does not correspond to a need for maintenance. Feature values with significant drift in the actionable alerting window are generally considered true positives as they correspond with the impending EICAS time-stamp at $T_n$ within a period of time in which action can be taken; whereas, feature values with significant change in the window immediately preceding the EICAS time-stamp at $T_n$ are identified as false negatives as they may indicate a need for action, but not with enough lead time to take action without an unplanned interruption in service. Significant drift in the window immediately following the EICAS message at $T_{n-1}$ or immediately preceding the EICAS message at $T_n$ may indicate that the particular feature value is not related to or cannot be correlated to the particular EICAS message. This does not mean, however, that the particular feature value could not be used to predict a different EICAS message.

While the example provided in FIG. 3B represents feature values extracted from time-series data collected in multiple flights taken by a single aircraft, in alternative embodiments, feature values can be extracted from time-series data collected in multiple flights taken by multiple aircraft. In this case, feature values from one aircraft that are tagged as falling within the actionable alerting window can be compared with feature values of another aircraft that are tagged as falling within the healthy or efficient operation window to determine prognostic ability.

As discussed with respect to FIGS. 2A and 2B, while the process of correlating cluster feature values with EICAS message time-stamps is represented graphically in FIG. 3B, it will be understood by one of ordinary skill in the art that the graph of FIG. 3B is merely used to illustrate the process and that there is no requirement to plot or display the correlation in the precise manner disclosed.

Figure 4:
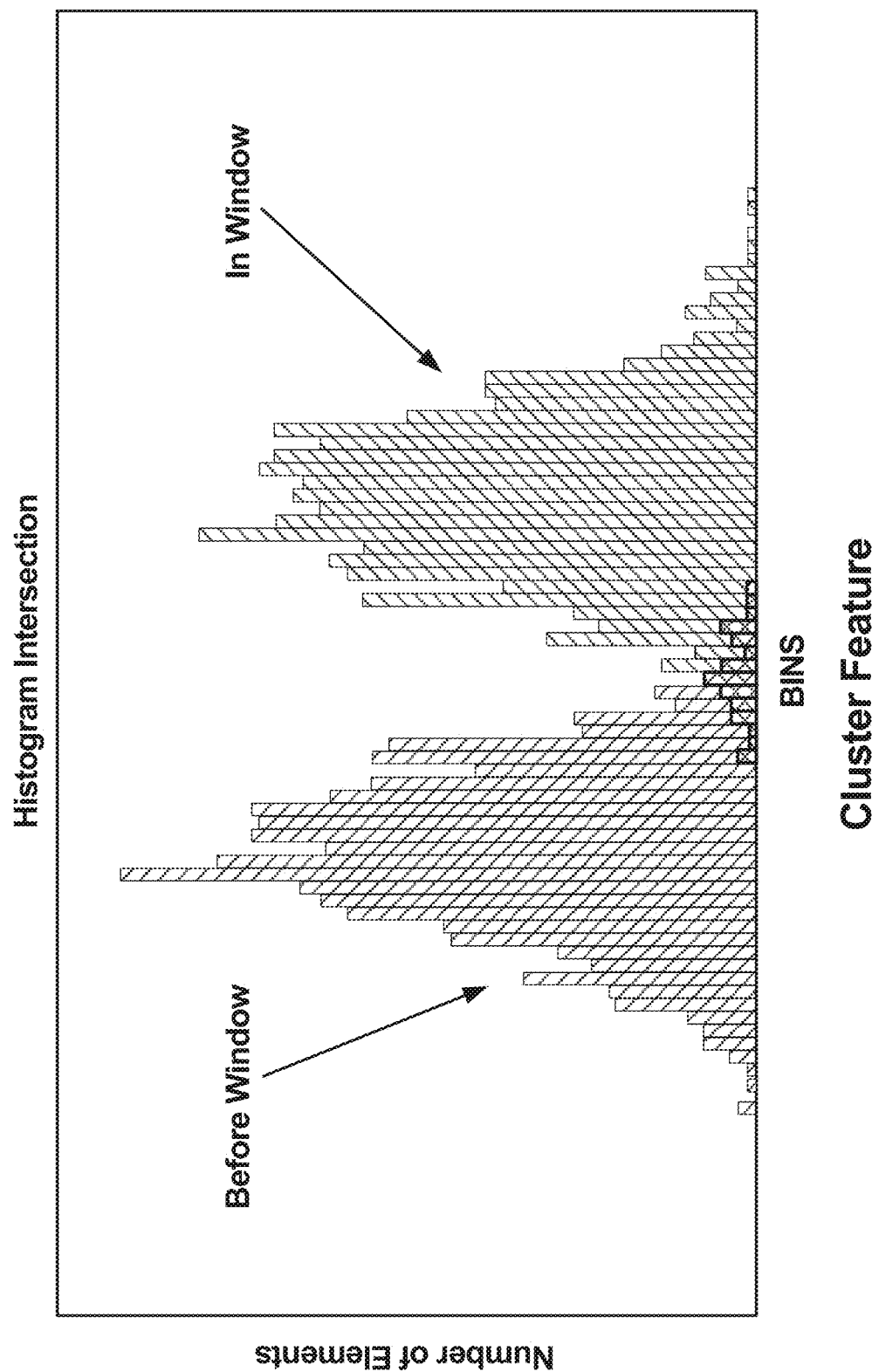
FIG. 4 is a graphical representation of cluster feature data according to their corresponding window of time from FIG. 3A.

FIG. 4 is a histogram of cluster feature values according to their corresponding window of time from FIG. 3A. Once the window time-stamps are established for a particular EICAS message and cluster feature values are compared as a function of time, most cluster feature values can be tagged as "before window" (healthy operation) or "in window" (actionable alerting window). Prognostic signatures of feature values are quantified by assessing the separation of the two normalized histograms (step 18). Specifically, by integrating the intersection of the two normalized histograms, a number between zero and one can be obtained, where one corresponds to no separation and zero corresponds to perfect separation. If there is no separation (i.e., the feature values completely overlap), the feature value does not provide a prognostic signature and cannot be used to predict the particular EICAS message. If there is complete separation (i.e., no overlap in the feature values in the "before window" and "in window"), the feature value may be a good candidate for use in predicting that particular EICAS message before it occurs. As discussed with respect to FIG. 3B, feature values can be extracted from multiple flights from one or more aircraft. For example, the feature values from one aircraft tagged as being "in window" can be compared to feature values from another aircraft tagged as being "before window."

The disclosed method can be repeated for all combinations of event messages and signal/cluster feature values. The results can be ranked by degree of separation of the histograms in the "before window" and "in window" time periods, with feature values showing high degree of separation being identified as good candidates for prognostic analytic development.

The disclosed method provides a systematic, robust methodology for identifying which full-flight time-series signals carry relevant information that is prognostic. Logical groupings or clusters of signals having complex/cryptic signal names can be identified in an automated fashion. Feature values can be extracted from clusters and assessed against all event messages to identify feature values that can be used to predict a particular event message before it occurs. Through automated signal clustering and assessing all cluster feature values against all event messages, feature value/event combinations having predictive capability can be identified.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method is described of identifying time-series signals that contain information useful for predicting impending event messages relating to one or more of safety, maintenance, and system operation information, before they occur. The method includes loading a plurality of time-series signals with assigned signal name and associated time-series data into a machine-readable storage medium and grouping the plurality of time-series signals based on textual similarity of the corresponding signal names into a signal cluster.

The method of the preceding paragraph can optionally include, additionally and/or alternatively, any one or more of the following features, configurations, additional components, and/or steps:

The method of the preceding paragraph, wherein the step of grouping signals can include comparing a first signal name of a first signal to a second signal name of a second signal character-by-character and assigning a similarity score to indicate the textual similarity between the first and second signal names.

The method of any of the preceding paragraphs, wherein the similarity score can range from a defined value indicating no similarity of the first and second signal names to a defined value indicating an exact match of the first and second signal names.

The method of any of the preceding paragraphs, wherein the signal cluster can include a pair of first and second signals with the similarity score exceeding a predefined threshold value and less than a value indicating an exact match.

The method of any of the preceding paragraphs can further include extracting a feature value from the signal cluster and correlating the cluster feature value with event message time-stamps.

The method of any of the preceding paragraphs, wherein extracting the feature value can include calculating a relationship between the time-series data of the first and second signals as a function of time. The relationship is the cluster feature value.

The method of any of the preceding paragraphs, wherein the time-series data can be collected for a plurality of discrete occurrences separated in time. The relationship between the time-series data of the first and second signals as a function of time can be calculated for each of the plurality of discrete occurrences thereby providing a plurality of cluster feature values.

The method of any of the preceding paragraphs, wherein the plurality of discrete occurrences can include a plurality of flights taken by one or more aircraft.

The method of any of the preceding paragraphs, wherein each of the cluster feature values can include a value selected from the group consisting of a mean, median, standard deviation, minimum, maximum, and a percentile distribution of the time-series data.

The method of any of the preceding paragraphs, wherein the step of correlating the cluster feature value can include comparing the plurality of cluster feature values as a function of time with event message time-stamps.

The method of any of the preceding paragraphs, wherein comparing cluster feature values as a function of time can further include identifying a time period preceding an event message time-stamp during which the plurality of cluster feature values in aggregate significantly change in value in comparison to an earlier time period.

The method of any of the preceding paragraphs can further include identifying an actionable alerting window and a non-actionable window. The actionable alerting window can cover a period of time between two consecutive event message time-stamps or a period of time leading up to an event message time-stamp in which action can be taken to minimize a service interruption. The non-actionable window can cover a period of time immediately preceding an event message time-stamp.

The method of any of the preceding paragraphs, wherein the time period over which feature values significantly drift away from the relatively constant value is within the actionable alerting window.

The method of any of the preceding paragraphs can further include applying principal component analysis to determine a relationship between the time-series data of for a plurality of at least first and second signals in a cluster as a function of time. The relationship is the cluster feature value.

The method of any of the preceding paragraphs, wherein signal names can be compared for a plurality of signals and the signals can be grouped based on textual similarity of signal names into a plurality of clusters with each cluster comprising a plurality of signals wherein the signal name of each signal in the cluster is compared to the signal name of each of the other signals in the cluster and wherein the similarity score for each comparison exceeds a predefined threshold value.

The method of any of the preceding paragraphs, wherein the step of correlating the cluster feature value with event message time-stamps can be conducted for a plurality of clusters.

The method of any of the preceding paragraphs, wherein the plurality of time-series signals can be grouped into a plurality of signal clusters based on textual similarity of the corresponding signal names.

The method of any of the preceding paragraphs, wherein each signal cluster can contain a unique set of time-series signals.

A method of minimizing service interruption of an aircraft includes loading a plurality of time-series signals with an assigned signal name and associated time-series data into a machine-readable storage medium, grouping the plurality of time-series signals based on textual similarity of the corresponding signal names into a signal cluster, extracting a plurality of feature values from the signal cluster, correlating the cluster feature values with event message time-stamps to identify cluster feature values that change in a manner that indicates within an actionable alerting time period that the event message will occur, and using the feature values to predict the event message before it occurs and provide an actionable recommendation. The event messages relate to at least one of safety, maintenance, and engine operation.

The method of the preceding paragraph can optionally include, additionally and/or alternatively, any one or more of the following features, configurations, additional components, and/or steps:

The method of the preceding paragraph, wherein grouping signals can include comparing a first signal name of a first signal to a second signal name of a second signal character-by-character and assigning a similarity score to indicate the textual similarity between the first and second signal names. The signal cluster can include a pair of first and second signals with the similarity score exceeding a predefined threshold value and less than a value indicating an exact match.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of identifying time-series signals from at least one full-flight of time-series signals from an aircraft that contain information useful for predicting impending event messages relating to one or more of engine safety, engine maintenance, and engine system operation information of the aircraft, before they occur, the method comprising:
    loading a plurality of time-series signals from the at least one full-flight of time-series signals from the aircraft into a machine-readable storage medium, wherein each time-series signal has an assigned signal name and associated time-series data;
    automatically identifying groupings of the plurality of time-series signals based on textual similarity of the corresponding signal names and grouping the time-series signals into signal clusters;
    extracting a cluster feature value from each of the signal clusters;
    identifying a non-actionable window, wherein the non-actionable window is a maintenance lead time and immediately precedes an event message time-stamp;
    identifying an actionable alerting window, wherein the actionable alerting window covers a period of time between two consecutive event message time-stamps and immediately precedes the non-actionable window; and
    correlating the cluster feature value with event message time-stamps in order to identify event messages with prognostic ability relating to one or more of engine safety, engine maintenance, and engine system operation, wherein correlating the cluster feature value comprises identifying a time period within the actionable alerting window during which the cluster feature value significantly changes in value in comparison to an earlier time period.

2. The method of claim 1, wherein the step of automatically identifying groupings comprises:
    comparing a first signal name of a first time-series signal to a second signal name of a second time-series signal character-by-character and assigning a similarity score to indicate the textual similarity between the first and second signal names.

3. The method of claim 2, wherein the similarity score ranges from a defined value indicating no similarity of the first and second signal names to a defined value indicating an exact match of the first and second signal names.

4. The method of claim 2, wherein each signal cluster comprises a pair of first and second time-series signals with the similarity score exceeding a predefined threshold value and less than a value indicating an exact match.

5. The method of claim 1, wherein extracting the cluster feature value comprises:
    calculating a relationship between the time-series data of first and second time-series signals as a function of time, wherein the relationship is the cluster feature value.

6. The method of claim 5, wherein the time-series data is collected for a plurality of discrete occurrences separated in time, and wherein the relationship between the time-series data of the first and second time-series signals as a function of time is calculated for each of the plurality of discrete occurrences thereby providing a plurality of cluster feature values.

7. The method of claim 6, wherein the plurality of discrete occurrences comprise a plurality of flights taken by one or more aircraft.

8. The method of claim 6, wherein each of the cluster feature values comprises a value selected from the group consisting of a mean, median, standard deviation, minimum, maximum, and a percentile distribution of the time-series data.

9. The method of claim 6, wherein the step of correlating the cluster feature value comprises:
comparing the plurality of the cluster feature values as a function of time with event message time-stamps.

10. The method of claim 9, wherein comparing the plurality of cluster feature values as a function of time further comprises:
identifying a time period preceding an event message time-stamp during which the plurality of cluster feature values in aggregate significantly change in value in comparison to an earlier time period.

11. The method of claim 10 and further comprising:
identifying an actionable alerting window and a non-actionable window, wherein the actionable alerting window covers a period of time between two consecutive event message time-stamps or a period of time leading up to an event message time-stamp in which action can be taken to minimize a service interruption and wherein the non-actionable window covers a period of time immediately preceding an event message time-stamp.

12. The method of claim 11, wherein the time period over which cluster feature values significantly drift away from the relatively constant value is within the actionable alerting window.

13. The method of claim 1, and further comprising:
applying principal component analysis to determine a relationship between the time-series data of a plurality of at least first and second time-series signals in a cluster as a function of time, wherein the relationship is the cluster feature value.

14. The method of claim 1, wherein signal names are compared for a plurality of time-series signals and wherein time-series signals are grouped based on textual similarity of signal names into a plurality of clusters with each cluster comprising a plurality of time-series signals wherein the signal name of each time-series signal in the cluster is compared to the signal name of each of the other time-series signals in the cluster and wherein the similarity score for each comparison exceeds a predefined threshold value.

15. The method of claim 1, wherein the step of correlating the cluster feature value with event message time-stamps is conducted for a plurality of clusters.

16. The method of claim 1, wherein the plurality of time-series signals are grouped into the signal clusters based on textual similarity of the corresponding signal names.

17. The method of claim 16, wherein each signal cluster contains a unique set of time-series signals.

18. A method of identifying time-series signals from at least one full-flight of time-series signals from an aircraft that contain information useful for predicting impending event messages relating to one or more of engine safety, engine maintenance, and engine system operation information of the aircraft, in order to minimize service interruption of an aircraft, the method comprising:
loading a plurality of time-series signals from the at least one full-flight of time-series signals from the aircraft into a machine-readable storage medium, wherein each time-series signal has an assigned signal name and associated time-series data;
automatically identifying groupings of the plurality of time-series signals based on textual similarity of the corresponding signal names and grouping the time-series signals into a signal cluster;
extracting a plurality of feature values from the signal cluster;
identifying a non-actionable window, wherein the non-actionable window is a maintenance lead time and immediately precedes an event message time-stamp;
identifying an actionable alerting window, wherein the actionable alerting window covers a period of time between two consecutive event message time-stamps and immediately precedes the non-actionable window;
correlating the cluster feature values with event message time-stamps to identify cluster feature values that change in a manner that indicates within the actionable alerting window that the event message will occur; and
using the cluster feature values to predict the event message before it occurs and provide an actionable recommendation;
wherein event messages relate to one or more of engine safety, engine maintenance, and engine operation.

19. The method of claim 18, wherein grouping signals comprises:
comparing a first signal name of a first time-series signal to a second signal name of a second time-series signal character-by-character and assigning a similarity score to indicate the textual similarity between the first and second signal names, and wherein the signal cluster comprises a pair of first and second time-series signals with the similarity score exceeding a predefined threshold value and less than a value indicating an exact match.

* * * * *